(12) United States Patent
Marchini et al.

(10) Patent No.: US 9,744,733 B2
(45) Date of Patent: Aug. 29, 2017

(54) PROCESS FOR MANUFACTURING TYRES FOR VEHICLE WHEELS

(75) Inventors: Maurizio Marchini, Milan (IT); Gianni Mancini, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 60 days.

(21) Appl. No.: 13/260,136

(22) PCT Filed: Apr. 7, 2010

(86) PCT No.: PCT/IB2010/000812
§ 371 (c)(1),
(2), (4) Date: Sep. 23, 2011

(87) PCT Pub. No.: WO2010/116253
PCT Pub. Date: Oct. 14, 2010

(65) Prior Publication Data
US 2012/0024464 A1   Feb. 2, 2012

Related U.S. Application Data

(60) Provisional application No. 61/213,849, filed on Jul. 21, 2009.

(30) Foreign Application Priority Data

Apr. 8, 2009   (IT) .............................. MI2009A0565

(51) Int. Cl.
*B29D 30/48* (2006.01)
*B29D 30/00* (2006.01)
*B29D 30/50* (2006.01)

(52) U.S. Cl.
CPC ......... *B29D 30/48* (2013.01); *B29D 30/0016* (2013.01); *B29D 30/50* (2013.01); *B29D 2030/486* (2013.01); *B29D 2030/487* (2013.01)

(58) Field of Classification Search
CPC .. B29D 30/005; B29D 30/0016; B29D 30/18; B29D 30/32; B29D 30/48; B29D 30/50;
(Continued)

(56) References Cited

U.S. PATENT DOCUMENTS 1,590,371 A * 6/1926 Haren ........................... 156/202
1,944,768 A * 1/1934 Stevens ........................ 156/136
(Continued)

FOREIGN PATENT DOCUMENTS

EP   0 468 345 A1   1/1992
EP   0 647 522 A1   4/1995
(Continued)

OTHER PUBLICATIONS

International Search Report from the European Patent Office for International Application No. PCT/IB2010/000812, mailing date Nov. 25, 2010.
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

In the building of a carcass structure for tires of vehicle wheels, the step of reinforcing with a loop at least one annular anchoring structure associated at the axially opposite end edges of a carcass ply is carried out on at least one radially expandable/contractable service drum and includes the steps of: setting the service drum to a predetermined radial dimension selected according to the fitting diameter of the tire to be manufactured, depositing the loop on the service drum, loading the annular anchoring structure onto the service drum in a radially outer position with respect to the loop, radially expanding the service drum up to lock in position the annular anchoring structure, rotating the service drum about a longitudinal axis thereof and, during the
(Continued)

rotation, turning the loop up about the annular anchoring structure.

21 Claims, 8 Drawing Sheets

(58) Field of Classification Search
CPC .......... B29D 30/243; B29D 2030/0044; B29D 2030/0055; B29D 2030/3214; B29D 2030/3257; B29D 2030/3264; B29D 2030/486; B29D 2030/487; B29D 2030/206
USPC .......... 156/111, 130.3, 130.7, 132, 135, 136, 156/398, 402, 422, 460; 152/542
See application file for complete search history.

(56) References Cited

U.S. PATENT DOCUMENTS

| | | | | |
|---|---|---|---|---|
| 3,025,209 | A * | 3/1962 | Trevaskis et al. ..... | B29D 30/28 156/398 |
| 3,185,607 | A * | 5/1965 | Nebout .......... | 156/443 |
| 3,509,929 | A * | 5/1970 | Delobelle ..... | 152/554 |
| 3,888,720 | A * | 6/1975 | Habert .......... | 156/414 |
| 4,145,238 | A * | 3/1979 | Bottasso et al. ..... | 156/132 |
| 4,196,036 | A * | 4/1980 | Allen et al. ..... | 156/422 |
| 4,214,940 | A * | 7/1980 | Rost ......... | 156/402 |
| 4,450,025 | A * | 5/1984 | Henley .......... | 156/132 |
| 4,927,488 | A | 5/1990 | Abe et al. | |
| 5,004,516 | A * | 4/1991 | Koga et al. ..... | 156/463 |
| 5,074,949 | A * | 12/1991 | Kusakabe .......... | B29D 30/28 156/402 |
| 5,080,738 | A * | 1/1992 | Araki et al. ..... | 156/136 |
| 5,108,538 | A * | 4/1992 | Kokubu et al. ..... | 156/460 |
| 5,282,912 | A | 2/1994 | Kokubu et al. | |
| 5,350,470 | A * | 9/1994 | Mochel et al. ..... | 156/136 |
| 5,632,836 | A | 5/1997 | Verschoor et al. | |
| 5,651,849 | A * | 7/1997 | Pizzorno ....... | 156/132 |
| 6,343,638 | B1 * | 2/2002 | Weaver et al. ..... | 156/415 |
| 2003/0168144 | A1 * | 9/2003 | Weaver et al. ..... | 152/415 |
| 2007/0215265 | A1 * | 9/2007 | Sata .......... | 156/110.1 |
| 2007/0256790 | A1 * | 11/2007 | Nijhuis .......... | 156/422 |
| 2007/0272345 | A1 | 11/2007 | Sawada | |
| 2010/0065184 | A1 * | 3/2010 | Hamzeh et al. ..... | 152/542 |

FOREIGN PATENT DOCUMENTS

| | | |
|---|---|---|
| EP | 0 928 680 A1 | 7/1999 |
| EP | 1 724 100 A1 | 11/2006 |
| JP | 62-009413 B2 * | 2/1987 |
| JP | 08-039568 | 2/1996 |
| WO | WO-2008/152453 A1 * | 12/2008 |
| WO | WO 2009/040594 A1 | 4/2009 |

OTHER PUBLICATIONS

Office Action, issued in corresponding Application No. 10 717 753.7-1706, from the European Patent Office, dated Mar. 20, 2013, 5 pages.

* cited by examiner

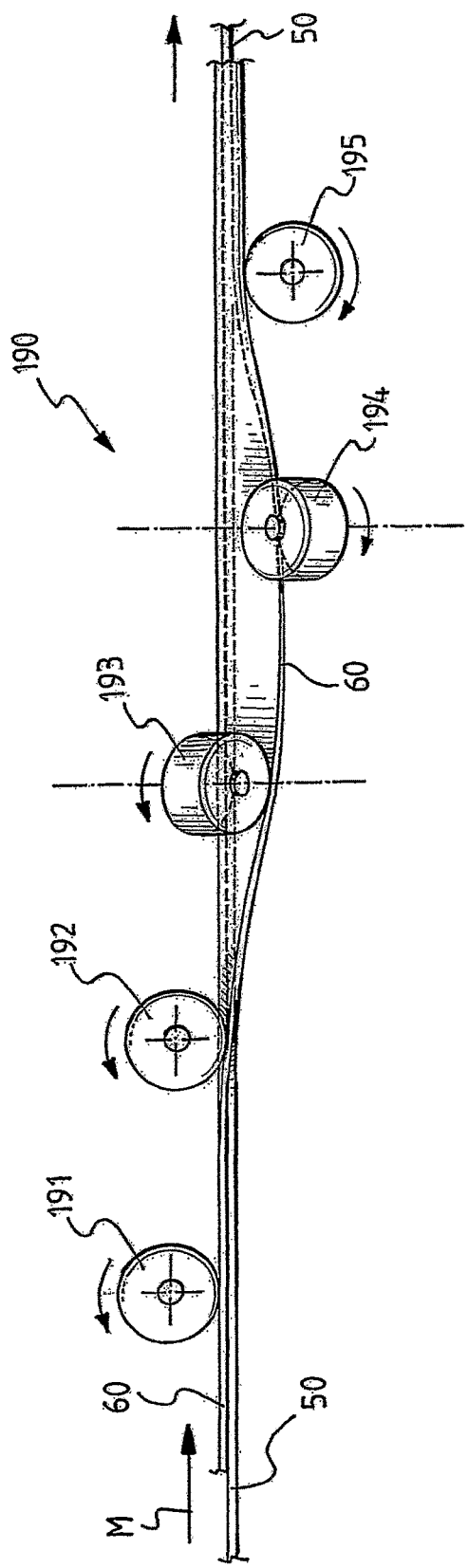

PROCESS FOR MANUFACTURING TYRES FOR VEHICLE WHEELS

CROSS REFERENCE TO RELATED APPLICATIONS

This application is a national phase application based on PCT/IB2010/000812, filed Apr. 7, 2010, and claims the priority of Italian Application No. MI2009A000565, filed Apr. 8, 2009, and the benefit of U.S. Provisional Application No. 61/213,849, filed Jul. 21, 2009, the content of all of which is incorporated herein by reference.

BACKGROUND OF THE INVENTION

Field of the Invention

The present invention relates to a process for manufacturing tyres for vehicle wheels.

The invention further relates to a process and an apparatus for reinforcing with a loop an annular anchoring structure of a tyre for vehicle wheels, said process and said apparatus being usable in carrying out the above process for manufacturing the tyre.

Description of the Related Art

A tyre for vehicle wheel generally comprises a carcass structure comprising at least one carcass ply comprised of reinforcing cords embedded in an elastomeric matrix. The carcass ply has end edges respectively engaged with annular anchoring structures arranged in the zones usually identified with the name of "beads" and normally consisting each of a substantially circumferential annular insert on which at least one filling insert is applied, in a radially outer position thereof. Such annular inserts are commonly identified as "bead cores" and have the task of keeping the tyre firmly fixed to the anchoring seat specifically provided in the rim of the wheel, thus preventing, in operation, the radially inner end edge of the tyre coming out from such a seat.

At the beads specific reinforcing structures (known, in the field of tyres, by the term: loops) may be provided, these reinforcing structures having the function of improving the torque transmission to the tyre. In fact, the bead region is particularly active in the torque transmission from the rim to the tyre during acceleration and braking, and therefore the provision of proper reinforcing structures in such zone ensures that the torque transmission takes place with the maximum possible reactivity.

In a radially outer position with respect to the carcass ply, a belt structure comprising one or more belt layers is associated, said belt layers being arranged radially one on top of the other and having textile or metal reinforcing cords with crossed orientation and/or an orientation substantially parallel to the direction of circumferential extension of the tyre.

Between the carcass structure and the belt structure a layer of elastomeric material, known as "under-belt", can be provided, said layer having the function of making the radially outer surface of the carcass structure as uniform as possible for the subsequent application of the belt structure.

In a radially outer position with respect to the belt structure a tread band is applied, also made of elastomeric material as well other structural elements making up the tyre.

Between the tread band and the belt structure a so-called "under-layer" of elastomeric material can be arranged, said under-layer having properties suitable for ensuring a steady union of the tread band itself.

On the side surfaces of the carcass structure respective sidewalls of elastomeric material are also applied, each extending from one of the side edges of the tread band up to the respective annular anchoring structure to the beads.

The traditional processes for manufacturing tyres for vehicle wheels essentially provide for the components of the tyre listed above to be first made separately from one another, to be then assembled in a subsequent building step of the tyre.

However, the current tendency is that of using manufacturing processes that allow the manufacturing and storage of semi-finished parts to be minimised or possibly eliminated. In such processes, each component of the tyre is directly formed on a forming support, for example as illustrated in EP 0 928 680 in the name of the same Applicant.

More specifically, attention has now turned towards process solutions that allow the individual components of the tyre to be made by directly building them, according to a predetermined sequence, onto the tyre being built on a forming support, typically toroidal or cylindrical.

For example, WO 2009/040594 in the name of the same Applicant, shows a process wherein the different building steps of the carcass structure are carried out at least in part simultaneously with the steps of making the crown structure at respective separate work stations, wherefrom the respective products must come out in a synchronised manner so as to proceed with the subsequent step of assembling the crown structure on the carcass structure and then, with the subsequent steps of the process for manufacturing the tyre.

Throughout the present description and in the following claims, the term "loop" is used to indicate an annular element comprising one or more thread-like reinforcing elements substantially parallel to one another, such as textile or metal cords, optionally embedded in, or coated with, a layer of elastomeric material, such annular element being obtained by cutting to size a band-like element and reciprocally joining a head portion and a tail portion of such band-like element.

The term: "elastomeric material" on the other hand is used to indicate a composition comprising at least one elastomeric polymer and at least one reinforcing filler. Preferably, such a composition further comprises additives such as, for example, a cross-linking agent and/or a plasticizer. Thanks to the provision of the cross-linking agent, such material may be cross linked by heating, so as to make the end product.

Throughout the present description and in following claims, the terms "radial" and "axial" and the expressions "radially inner/outer" and "axially inner/outer" are used by making reference to the radial direction and to the axial (or longitudinal) direction of a tyre (or of a drum used for building the tyre or one or more components of the tyre). The terms "circumferential" and "circumferentially" instead, are used by making reference to the annular extension of the tyre/drum.

U.S. Pat. No. 5,632,836 shows, in FIG. 1, a loop 6 wound about an annular anchoring structure 5, the latter comprising a plurality of bead cores 3 and a filling insert 4.

EP 0 647 522 shows, in FIG. 7, a loop 32 wound about an annular anchoring structure, the latter comprising a plurality of bead cores 30 and a filling insert 31. Loop 32 is first deposited on the annular outer surface of a service drum 6. The annular anchoring structure is then positioned on the loop 32. Loop 32 is then turned up about the annular anchoring structure by the effect of the thrust action exerted by lobes 11, 18 of the air tube 7 on the portions of loop 32 which axially extend from opposite sides with respect to the annular anchoring structure. Lobes 11, 18 are obtained by inflating an air tube 7 against a pair of annular bells 19, 20.

SUMMARY OF THE INVENTION

The Applicant has noted that a process of the type illustrated in EP 0 647 522 requires the use of a service drum specifically sized according to the specific fitting diameter of the tyre to be manufactured. When the fitting diameter (and thus, the radial dimension of the annular anchoring structures) of the tyre to be manufactured changes, it is necessary to use a new drum having a different radial dimension and a new device for turning up the loop (unless it is preferred to remove the turning up device from the previous drum and assemble it on the new drum, where this is possible). This causes a slowing down of the productivity and a considerable initial investment.

The Applicant has further noted that when the loop comprises metal cords, an early deterioration of the air tube occurs because of the friction on the metal cords. It is therefore necessary to proceed with a certain frequency to replace the air tube, with consequent problems of cost and time.

The Applicant has perceived that by having a forming support which is adjustable in radial direction it would be possible to loop in a sequence annular anchoring structures of different dimensions which are suitable for tyres with different fitting diameters, increasing consequently the production flexibility without reducing the plant productivity.

The Applicant has therefore found that by providing a service drum that is radially expandable/contractable with respect to the longitudinal axis thereof it is possible, by using the same apparatus, to obtain the looping of annular anchoring structures (and thus, of tyres) having different radial dimensions. In fact, it is possible to adjust the service drum to a plurality of different operative radial positions, each operative radial position being selected according to the radial dimension of the annular anchoring structure to be used, and thus of the fitting diameter of the tyre to be manufactured.

In this way it is possible to manufacture, by using the same apparatus, a plurality of reinforced annular anchoring structures having different radial dimensions, and thus a plurality of tyres having different fitting diameters.

In a first aspect thereof, the present invention therefore relates to a process for manufacturing tyres for vehicle wheels, comprising the step of building a carcass structure comprising at least one carcass ply associated, at axially opposite end edges thereof, with respective annular anchoring structures;

wherein the step of building the carcass structure comprises the step of reinforcing said at least one annular anchoring structure with a loop, said reinforcement step being carried out on at least one radially expandable/contractable service drum and comprising the steps of:

a) setting the service drum to a predetermined operative radial dimension selected according to the fitting diameter of the tyre to be manufactured;
b) depositing the loop on an annular portion of an annular outer surface of the service drum;
c) loading the annular anchoring structure onto the service drum in a radially outer position with respect to the loop;
d) radially expanding the service drum up to lock in position the annular anchoring structure;
e) rotating the service drum about a longitudinal axis thereof;
f) during rotation of the service drum, turning the loop up about the annular anchoring structure so as to form a reinforced annular anchoring structure;
g) unloading the reinforced annular anchoring structure from the service drum.

Advantageously, the process described above allows achieving an advantageous usage flexibility, making it possible to use a single apparatus for carrying out the looping of annular anchoring structures having different radial dimension. In addition thereof, an advantageous increase in the production yield is obtained when the radial dimension of the annular anchoring structure (and thus of the fitting diameter of the tyre to be manufactured) varies, as it is not necessary to replace the service drum and/or any further components/devices of the looping apparatus.

The Applicant further notes that the possibility of using a single apparatus for looping annular structures with different radial dimensions allows achieving an advantageous containment of the initial investment costs and of the production costs. Such costs are further reduced as no air tubes are used, which as said above with reference to EP 0 647 522 are subject to early damage when loops comprising metal cords are used.

In a second aspect thereof, the present invention relates to a process for reinforcing with a loop an annular anchoring structure of a tyre for vehicle wheels, comprising the steps of:

a) setting a radially expandable/contractable service drum to a predetermined operative radial dimension selected according to the fitting diameter of the tyre to be manufactured;
b) depositing the loop on an annular portion of an annular outer surface of the service drum;
c) loading the annular anchoring structure onto the service drum in a radially outer position with respect to the loop;
d) radially expanding the service drum up to lock in position the annular anchoring structure;
e) rotating the service drum about a longitudinal axis thereof;
f) during rotation of the service drum, turning the loop up about the annular anchoring structure so as to form a reinforced annular anchoring structure;
g) unloading the reinforced annular anchoring structure from the service drum.

Advantageously, such a process can be used in the process for manufacturing the tyre described above and thus it allows achieving the advantageous results mentioned above.

In a third aspect thereof, the present invention relates to an apparatus for reinforcing with a loop an annular anchoring structure of a tyre for vehicle wheels, the apparatus comprising:

at least one service drum having its own longitudinal axis;
  a device for feeding the loop towards the service drum;
  a device for loading/unloading the annular anchoring structure onto/from the service drum;
  a device for turning the loop up about the annular anchoring structure, to form a reinforced annular anchoring structure;
wherein the service drum is radially expandable/contractable with respect to said longitudinal axis so as to be adjusted to a plurality of predetermined radial dimensions selected according to the fitting diameter of the tyre to be manufactured.

Advantageously, such an apparatus can be used for carrying out the processes discussed above and thus it allows achieving the advantageous results mentioned above.

The present invention, in at least one of the aforementioned aspects, can comprise at least one of the following preferred features, taken individually or in combination with the others.

Preferably, the process for manufacturing the tyre further comprises a step of positioning the reinforced annular anchoring structure on the end edge of the carcass ply, the above steps a) to g) being repeated by a predetermined number of times before carrying out the above positioning step.

Advantageously, it is thus possible to prepare, by an off-line process with respect to the tyre manufacturing process, a plurality of reinforced annular anchoring structures, such reinforced annular anchoring structures being obtained starting from a corresponding plurality of annular anchoring structures. The reinforced annular anchoring structures may be collected into proper storage members, wherefrom they are then picked up, during the manufacturing of a carcass structure of one or more tyres, for being positioned on the end edge of a carcass ply previously deposited onto a forming support. This implies an increase in the overall production yield of the apparatus for building the carcass structure.

In the preferred embodiments of the present invention, at least one of the aforementioned steps a) and b) is carried out at least in part simultaneously to at least part of at least one of the aforementioned steps c) to g).

Clear advantages in terms of productivity are thus obtained. Such advantages are particularly appreciable in processes like those illustrated in the aforementioned document WO 2009/040594. It can be understood that the feature illustrated above allows in such processes a quicker manufacturing of carcass structures, making easier the synchronising operations of association with the crown structures, which are usually manufactured in basically shorter time.

Preferably, the step of turning the loop up is carried out at least in part simultaneously to at least part of at least one from step g) of unloading the reinforced annular anchoring structure from the service drum and step c) of loading a new annular anchoring structure onto the service drum.

This advantageously allows having the immediate availability of a new annular anchoring structure right after the annular anchoring structure which has been just reinforced is removed from the service drum.

Preferably, step c) of loading the annular anchoring structure onto the service drum comprises the steps of:
  taking the annular anchoring structure from a first storage member;
  moving the annular anchoring structure from the first storage member to the service drum.

Preferably, step g) of unloading the reinforced annular anchoring structure from the service drum comprises the steps of:
  radially contracting the service drum;
  taking the reinforced annular anchoring structure from the service drum;
  moving the reinforced annular anchoring structure from the service drum to a second storage member.

Advantageously, the radial contraction of the service drum allows an easy and immediate pick up of the annular anchoring structure just reinforced.

Preferably, step a) of setting the service drum to a predetermined operative radial dimension comprises a step of radially expanding the service drum until the annular outer surface thereof reaches a predetermined diameter selected according to the fitting diameter of the tyre to be manufactured.

Advantageously, the possibility of varying the radial dimension of the service drum allows drastically reducing the setup time and cost for manufacturing tyres having different fitting diameters.

In the preferred embodiments of the present invention, between step b) of depositing the loop onto an annular portion of an annular outer surface of the service drum and step c) of loading the annular anchoring structure onto the service drum in a radially outer position with respect to the loop, a step of moving the service drum from a first work station defined at a feeding device of the loop to a second work station defined at a device for loading/unloading the annular anchoring structure onto/from the service drum is carried out.

Advantageously, the provision of physically separate work stations for carrying out the steps of depositing the loop and loading/unloading the annular anchoring structure allows the simultaneous execution, on at least two different service drums, of at least part of the step of depositing the loop with at least part of at least one among the steps of loading the annular anchoring structure, turning the loop up and unloading the reinforced annular anchoring structure. Clear advantages in terms of productivity are thus obtained.

In particularly preferred embodiments of the present invention, the loop is obtained by cutting to size a band-like reinforcement element and step b) of depositing the loop onto an annular portion of an annular outer surface of the service drum comprises the steps of:—feeding the band-like reinforcement element towards the service drum;
  depositing a head portion of the band-like reinforcement element onto the annular outer surface of the service drum;
  rotating the service drum by a predetermined angle ($\alpha$) about the longitudinal axis thereof;
  during said rotation, depositing new portions of the band-like reinforcement element onto the annular outer surface of the service drum until a tail portion of the band-like reinforcement element is deposited.

Preferably, in a first embodiment of the present invention, after the step of depositing a head portion of the band-like reinforcement element onto the annular outer surface of the service drum, the following steps are carried out:
  rotating the service drum about said rotation axis by a first angle $\alpha$ greater than 270° and smaller than 360°;
  during said rotation, depositing new portions of the band-like reinforcement element onto the annular outer surface of the service drum.

More preferably, after the step of depositing new portions of the band-like reinforcement element onto the annular outer surface of the service drum, the following steps are carried out:
  cutting to size the reinforcing band-like element thus obtaining a piece of a band-like reinforcing element having a tail portion;
  rotating the service drum by an angle at least equal to 360°-$\alpha$ about said rotation axis (X-X);
  during said rotation by at least 360°-$\alpha$, depositing the tail portion of said piece of band-like reinforcement element onto the annular outer surface of the service drum.

In this case, cutting the band-like reinforcement element is an integral part of the process for depositing the band-like reinforcement element on the service drum and takes place before the service drum has made a complete revolution.

As an alternative, said predetermined angle $\alpha$ is equal to at least 360° and the band-like reinforcement element is cut to size before being fed towards the service drum.

Preferably, during the step of feeding the band-like reinforcement element towards the service drum, a step of associating an element made from elastomeric material on an outer side surface of the band-like reinforcement element is carried out.

Advantageously, the provision of an element made from elastomeric material on the outer side surface of the band-like reinforcement element make easier a possible manual grip, by an operator, of the reinforced annular anchoring structure at the radially outermost portion thereof. Such element made from elastomeric material, in fact, substantially covers any textile or metal cords projecting from the radially outer side surface of the band-like reinforcement element, preventing these cords from causing wounds or cuts to the operator.

Even more advantageously, the aforementioned element made from elastomeric material carries out the same functions as that element made from elastomeric material, also known as intermediate elongated element, which is typically deposited between the loop, especially when it is made of metal, and the carcass ply in a step of the process for building the carcass structure following that of positioning the annular anchoring structure on the end edge of the carcass ply. The provision of the above element made from elastomeric material associated with the band-like reinforcement element in the process of the present invention therefore makes the depositing of the intermediate elongated element unnecessary.

This implies first of all an increase in the overall production yield of the machine for building the carcass structure, the above increase being obtained by the fact that the provision of the element made from elastomeric material between the loop and the carcass ply is not anymore carried out during execution of the process for building the carcass structure, but it carried out in through an off-line process that does not interfere with the above building process. An advantageous reduction of the initial investment costs is also achieved, such reduction being obtained as those devices which are typically required in conventional processes for depositing the intermediate elongated element need not anymore be set up in the carcass structure building line.

Preferably, the aforementioned element made from elastomeric material is arranged astride the outer side surface of the band-like reinforcement element. Anyway, embodiments of the present invention are provided wherein the element made from elastomeric material is associated cantilevered to the outer side surface of the band-like reinforcement element.

In particularly preferred embodiments of the present invention, the annular portion of annular outer surface of the service drum is in an offset axial position with respect to a transversal middle plane of the service drum.

Preferably, step c) of loading the annular anchoring structure onto the service drum comprises the step of positioning the annular anchoring structure in a centred position with respect to a transversal middle plane of the service drum.

Advantageously, it is thus possible to achieve that the opposite free end edges of the loop which has been turned up about the annular anchoring structure are offset along the radial direction.

Preferably, the step of turning the loop up is carried out by moving in synchrony at least one pair of turning members with a combined motion along a first direction parallel to the longitudinal axis of the service drum and along a second direction perpendicular to the longitudinal axis of the service drum, said turning members being arranged on opposite sides with respect to a transversal middle plane of the service drum.

Advantageously, the synchronous movement of the aforementioned turning members allows an even and effective deposition of the loop on the opposite surfaces of the annular anchoring structures.

According to a preferred embodiment, the service drum can rotate about the longitudinal axis thereof.

Advantageously, the combination between rotating motion of the drum and combined motion of the turning members allows an even and effective deposition of the loop along the circumferential extension of the annular anchoring structure.

In particularly preferred embodiments of the present invention, two service drums are used, these service drums being arranged on opposite sides with respect to a pivoting axis and being integrally movable about said pivoting axis between a first work station defined at the device for feeding the loop and a second work station defined at the device for loading/unloading the annular anchoring structure.

Advantageously, the provision of two service drums which can be integrally moved about a single pivoting axis between physically separate work stations allows the simultaneous execution of at least part of the step of depositing the loop with at least part of at least one among the steps of loading the annular anchoring structure, turning the loop up and unloading the reinforced annular anchoring structure. This implies clear advantages in terms of productivity.

Preferably, the service drum comprises a central shaft arranged coaxially to the above longitudinal axis and a plurality of support members arranged adjacent to one another in a circumferential direction about said central shaft and radially movable in synchrony between a position of maximum contraction and a position of maximum expansion.

Advantageously, the synchronous movement in radial direction of the above support members carries out the radial expansion/contraction of the service drum and allows setting up the above drum to the radial position defined in the design stage based on the fitting diameter of the tyre to be manufactured.

Preferably, each support member comprises a central support body and two opposite side support bodies, the side support bodies being slidable in synchrony toward/away from the central body along a direction parallel to said longitudinal axis.

More preferably, each side support body of at least one of said support members comprises a radial opening extending longitudinally up to a free end facing the central support body.

Advantageously, the aforementioned radial opening allows the turning members to position themselves in proximity of the annular anchoring structure while this is still supported by the side support bodies and by the central support body, to then proceed with the turning up of the loop.

In the preferred embodiment thereof, the present invention comprises a device for adjusting the radial movement of said support members and a device for locking said support members in position.

Preferably, the adjustment device comprises a guiding flange integrally associated with the central shaft, at least one helically-shaped sliding guide formed on said guiding flange, a plurality of radially extended sliding guides selectively coupled to the central shaft and a plurality of sliding blocks which extend radially with respect to said longitudinal axis.

More preferably, each of said sliding blocks is slidingly coupled to a respective radially extended sliding guide.

Even more preferably, each support member is integrally coupled to at least one respective sliding block and slidingly coupled to said at least one helically-shaped sliding guide.

Preferably, when the radially extended sliding guides are coupled to the central shaft, a predetermined angular movement of the central shaft causes a predetermined radial movement of each support member.

Advantageously, the setup of the service drum to the desired radial position is achieved by simply rotating the aforementioned central shaft by a predetermined angle. Such rotation in fact causes a predetermined radial movement of the support members.

Preferably, the locking device comprises a calibration flange integrally associated with the central shaft and a pin elastically coupled to a respective radially extended sliding guide.

More preferably, said pin is movable between a first operating position wherein it is coupled in rotation to the central shaft—thus making the central shaft and the support members integral to one another in rotation and locking the support members in a radial position—and a second operating position wherein it is disconnected in rotation from the central shaft—thus achieving the radial movement of the support members.

Preferably, the locking device further comprises a pneumatic cylinder adapted to control the movement of said pin from said first operating position to said second operating position, or vice versa, in opposition to an elastic action exerted by a spring operatively arranged between the pin and one of said sliding guides.

Preferably, the device for turning the loop up comprises at least one pair of turning members arranged on opposite sides with respect to a transversal middle plane of the service drum.

More preferably, such turning members are movable in synchrony with a combined motion along a first direction parallel to the longitudinal axis of the service drum and along a second direction perpendicular to the longitudinal axis of the service drum.

In a first embodiment of the invention, each turning member is defined by a conical roller which can rotate about a rotation axis inclined with respect to the longitudinal axis of the service drum.

Advantageously, the conical shape of the rollers allows the even deposition of the loop on the side surface of the annular anchoring structure during the movement of the rollers along the aforementioned two perpendicular axes.

In an alternative embodiment of the present invention, each turning member comprises a plurality of rollers arranged circumferentially one next to the other at a plurality of circumferences with respect to an axis perpendicular to the longitudinal axis of the service drum.

Advantageously, the roller-like configuration described above allows obtaining different peripheral speeds at the above circumferences, the angular speed being the same. In the practice, this leads to a more homogeneous deposition of the loop on the side surface of the annular anchoring structure.

Preferably, the device for loading/unloading the annular anchoring structure onto/from the service drum comprises at least one motorised arm for gripping and moving the annular anchoring structure.

In the preferred embodiment of the present invention, the device for loading/unloading the annular anchoring structure onto/from the service drum comprises two motorised arms for gripping and moving the annular anchoring structure.

Preferably, a first arm is intended to load the annular anchoring structure on the service drum and a second arm is intended to unload the reinforced annular anchoring structure from the service drum.

It is thus possible to obtain a partial overlapping of the steps of loading the annular anchoring structure on the service drum and unloading the reinforced annular anchoring structure from the service drum.

Preferably, the (or each) motorised arm comprises a member for gripping the annular anchoring structure with respect to a central axis.

More preferably, said gripping member also carries out a centring of the annular anchoring structure.

Preferably, the gripping and centring member comprises a plurality centring elements which are equally spaced in a circumferential direction and radially movable, in a synchronous manner, with respect to said central axis.

In the preferred embodiments of the present invention, a member for depositing an element made from elastomeric material on a side surface of the loop is provided.

Preferably, said depositing member comprises a plurality of rollers arranged one after the other along a moving direction of the loop, with at least some of the respective rotation axes which are skew to one another, in order to deposit said element made from elastomeric material astride the side surface of the loop.

Preferably, a first storage member for annular anchoring structures to be loaded onto the service drum and a second storage member for reinforced annular anchoring structures unloaded from the service drum are also provided.

Preferably, said first and second storage members belong to a moving line arranged in a position adjacent to the service drum.

Preferably, a third storage member for annular anchoring structures to be loaded onto the service drum is also provided, said third storage member being arranged upstream of the first storage member.

BRIEF DESCRIPTION OF THE DRAWINGS

Further features and advantages of the present invention will appear more clearly from the following detailed description of some preferred embodiments of an apparatus and process according to the present invention, made with reference to the annexed drawings. In such drawings:

FIG. 4 is a schematic side view of a further detail of the apparatus of FIG. 1 in an operative step of the process of the present invention;

DETAILED DESCRIPTION OF THE INVENTION

Figure 1:
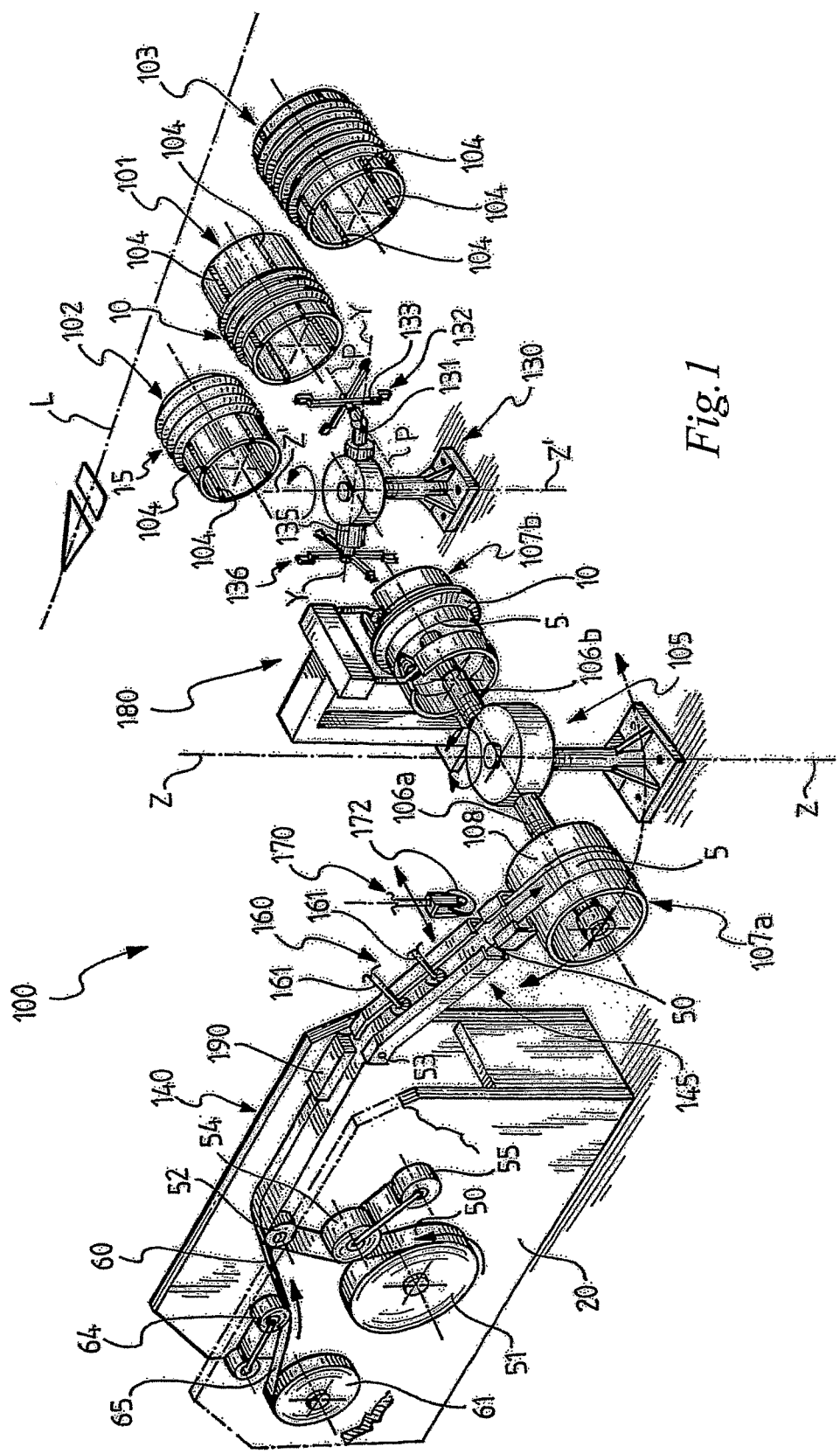
FIG. 1 is a perspective schematic view of an apparatus according to the present invention, in an operating step of the process of the present invention.
Figure 8:
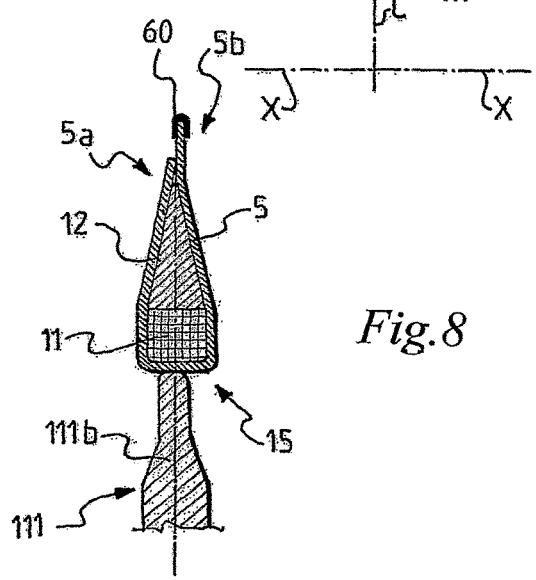
FIG. 8 is a section view of a detail of FIG. 7.

In FIG. 1, with reference numeral 100 is globally indicated an exemplary embodiment of an apparatus for depositing a loop 5 (FIG. 8) on an annular anchoring structure 10 (FIG. 6) of a tyre for vehicle wheels, so as to manufacture reinforced annular anchoring structures 15 (FIG. 8). Apparatus 100 allows carrying out a deposition process according to the present invention.

Figure 2:
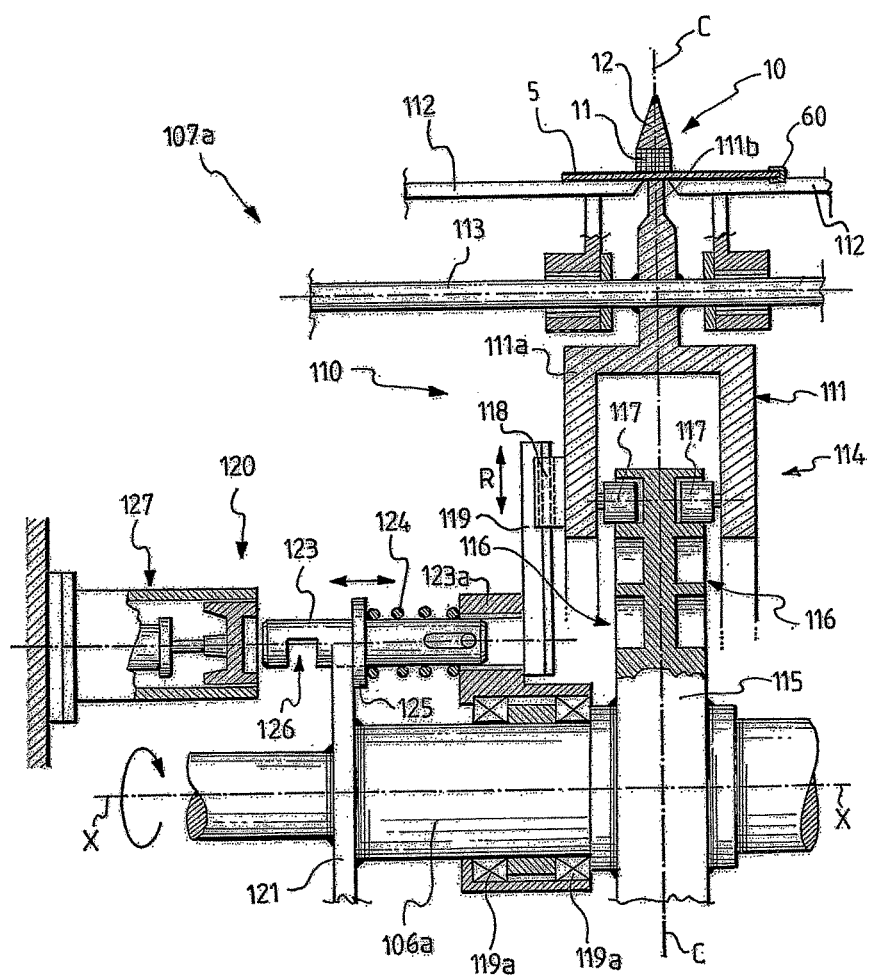
FIG. 2 is a schematic section view of a construction detail of the apparatus of FIG. 1 in an operative step of the process of the present invention.

As illustrated in detail in FIG. 2, the annular anchoring structure 10 comprises one substantially circumferential annular insert 11, also called bead core, and a filling insert 12 associated with the substantially circumferential annular insert 11 in a radially outer position thereof.

By the apparatus 100 and the deposition process of the present invention, the loop 5 is associated with the annular anchoring structure 10 so as to fully wrap the latter along the entire circumferential extension thereof and so that the two end edges 5a, 5b of loop 5 are offset in the radial direction (FIG. 8) by at least a pair of millimeters (preferably about 5 mm).

The reinforced annular anchoring structures 15 are intended to be used in the building of a carcass structure of the tyre. They are located in the tyre beads and are intended to keep the tyre well fixed to the anchoring seat specifically provided in the rim of the vehicle wheel.

The building of the tyre carcass structure comprises at least the initial step of depositing a carcass ply on a forming support. Subsequently, each reinforced annular anchoring structure 15 is associated with each of the opposite end edges of the carcass ply.

In the specific example illustrated in FIG. 1, apparatus 100 comprises a member 101 for storing annular anchoring structures 10, a member 102 for storing reinforced annular anchoring structures 15 and a further member 103 for storing annular anchoring structures 10. The above storage members belong to a movement line (generally indicated in FIG. 1 by arrow L) and the storage member 103 is arranged along such a line upstream of the storage member 102, so as to take the place of the latter once all the annular anchoring structures arranged on the storage member 102 have been picked up. This in order to ensure a continuity of production of the reinforced annular anchoring structures 15.

Each storage member 101-103 is substantially shaped as a cylindrical drum provided with longitudinal grooves 104 (for clarity of illustration, the reference numeral 104 is associated with only some of the above grooves) adapted to allow the gripping of the annular anchoring structures 10 from the storage member 101 at the radially inner surface of the substantially circumferential annular insert 11. The above grooves 104 also allow the unloading of the reinforced annular anchoring structures 15 on the storage member 102.

The storage members 101-103 may however be of a different type than what described above; for example, they may be provided as baskets wherein the annular anchoring structures 10 or the reinforced annular anchoring structures 15 are stacked.

As illustrated in FIG. 1, close to the storage members 101, 102, 103 the apparatus 100 comprises a service member 105 which can rotate about a pivoting axis Z-Z.

The service member 105 comprises two opposite shafts 106a, 106b having respective longitudinal axes X-X which extend along a same direction perpendicular to axis z-z. Respective service drums 107a, 107b, totally identical to one another, are mounted on shafts 106a, 106b, each service drum being capable of rotating about the respective longitudinal axis X-X.

As better described hereinafter, the position of the service drums 107a, 107b may be exchanged to allow carrying out in a sequence, on each of them, the deposition of the loop 5, the positioning of the annular anchoring structure 10 in a radially outer position with respect to the loop 5 and the turning up of the loop 5 about the annular anchoring structure 10, so as to form the reinforced annular anchoring structure 15.

In particular, with reference to the position of the two service drums 107a, 107b illustrated in FIG. 1, the loop 5 is deposited on the service drum 107a whereas the annular anchoring structure 10 is positioned on the service drum 107b in a radially outer position with respect to the loop 5 and the loop 5 is turned up about the annular anchoring structure 10.

As better described hereinafter, in a subsequent step of the process of the present invention, the service drums 107a, 107b are moved integrally in rotation about the pivoting axis Z-Z exchanging their position; the service drum 107a therefore moves in the operating position occupied in FIG. 1 by drum 107b and vice versa. In this new operating position, the annular anchoring structure 10 is positioned on the service drum 107a in a radially outer position with respect to a previously deposited loop 5, such loop 5 is turned about the annular anchoring structure 10 for forming the reinforced annular anchoring structure 15, and the reinforced annular anchoring structure 15 is unloaded. On the other hand, a new loop 5 is deposited on the service drum 107b for making a new reinforced annular anchoring structure 15, the previously formed reinforced annular anchoring structure 15 having been removed from the service drum 107b.

The use of two service drums 107a, 107b allows carrying out at least part of the steps carried out at the service drum 107a simultaneously with at least part of the steps carried out on the service drum 107b.

Apparatus 100 of the present invention shall be described hereinafter with reference to the operating position of the service drums 107a, 107b illustrated in FIG. 1.

With reference to such figure, a device 130 for loading the annular anchoring structure 10 on the service drum 107b and unloading the reinforced annular anchoring structure 15 from the service drum 107b is operatively interposed between the storage members 101, 102 and 103 and the service member 105.

In particular, device 130 comprises a first motorised arm 131 which can be moved with articulated motion between the storage member 101 and the service member 105 for taking the annular anchoring structure 10 from the storage member 101 and loading it on the service drum 107b. Device 130 also comprises a second motorised arm 135 which can be moved with articulated motion between the service member 105 and the storage member 102 of the reinforced annular anchoring structures 15 for unloading the reinforced annular anchoring structure 15 from the service drum 107b and placing it on the storage member 102.

The motorised arm 131 is rotatable about a rotation axis Z'-Z' parallel to the rotation axis of the service member 105 and comprises, at a free end thereof, a gripping member 132 of the annular anchoring structure 10. Likewise, the motorised arm 135 is rotatable about the above rotation axis Z'-Z' and comprises, at a free end thereof, a gripping member 136 of the reinforced annular anchoring structure 15.

FIG. 1 shows a step of the process of the present invention wherein the motorised arms 131, 135 rotate in counter clockwise with respect to the rotation axis Z'-Z'. The motorised arm 131 has just loaded an annular anchoring structure 10 on the service drum 107b and is moving from the service drum 107b towards the storage member 101 for taking a new annular anchoring structure 10; the motorised arm 135, on the other hand, has just unloaded on the storage member 102 an annular anchoring structure 15 previously taken from the service drum 107b and is moving from the storage member 102 towards the service drum 107b for taking a new reinforced annular anchoring structure 15.

The gripping members 132 and 136 are identical. For simplicity of description and clarity of illustration, only one of them is described hereinafter (in particular the gripping member 132), it being understood that the elements described below with reference to such a gripping member are also provided in the gripping member 136. Therefore, what said below with reference to the gripping member 132 also applies to the gripping member 136.

The gripping member 132 is rotatable with respect to a longitudinal extension axis Y-Y of the motorised arm 131 and is linearly movable in both directions along a direction perpendicular to said axis Y-Y (such direction is indicated in FIG. 1 with arrow P).

The gripping member 132 comprises a plurality of gripping and centring arms 133 (for clarity of illustration, numeral reference 133 is associated to only one of the above arms) equally spaced in a circumferential direction with respect to a central axis of the gripping member 132 and radially movable, in a synchronous manner, with respect to the above central axis. Such radial movement allows gripping, centring and unloading the annular anchoring structure 10.

Opposite to the device 130 for loading (unloading) the annular anchoring structures 10 (reinforced annular anchoring structures 15), apparatus 100 comprises a device for depositing the loop 5 on the service drum 107a.

The loop 5 is obtained by cutting to size a band-like reinforcement element 50 previously collected on a reel 51. As illustrated in FIG. 1, during the execution of the process of the present invention, the band-like reinforcement element 50, which is associated with a service fabric, is unwound from such reel 51. Thanks to the interaction provided by a first contrast roller 54 the service fabric leaves the band-like reinforcement element 50 and is collected on a first winding roller 55. After that, the band-like reinforcement element 50, deviated by a first diverter roller 52 and by a second diverter roller 53, is properly fed on a portion of the annular outer surface 108 of the service drum 107a by a suitable feeding device 140.

Reel 51, diverter rollers 52 and 53, the first contrast roller 54 and the first winding roller 55 are preferably housed inside a support frame 20 arranged in a position adjacent the service member 105.

The feeding device 140 comprises, downstream of the second diverter roller 53, an output portion 145 supported cantilevered from the frame 20 and suitably oriented towards the annular outer surface 108 of the service drum 107a.

In particular, the output portion 145 of the feeding device 140 is tilted by a predetermined angle with respect to a horizontal plane and points from top downwards on the annular outer surface 108 of the service drum 107a.

The feeding of the band-like reinforcement element 50 towards the service drum 107a is obtained by a device 160 for capturing and moving the band-like reinforcement element 50.

In the embodiment shown in FIG. 1, such device 160 comprises at least one pair of suction cups 161 whose movement causes the unwinding of the band-like reinforcement element 50 from the reel 51 and thus, the feeding of the band-like reinforcement element 50 on the annular outer surface 108 of the service drum 107a.

More specifically, according to a preferred embodiment, suction cups 161 carry the head of loop 5 from the cutting zone to the service drum 107a. A depositing roller (not shown in the figures), preferably made from elastomeric material, is rested onto the head of loop 5, and after the suction cups 161 have released the grip on the loop 5, the service drum 107a starts rotating. The pressure the depositing roller creates on loop 5 during the deposition ensures the friction/adhesion between loop 5 and service drum 107a, necessary for winding the loop 5 on the service drum itself, thus carrying out the deposition step.

As an alternative to suction cups 161 it is possible to use suction members or, if the band-like reinforcement element 50 comprises metal cords, an electromagnet device, all of the conventional type.

Apparatus 100 of the present invention further comprises a cutting member 170 of the band-like reinforcement element 50. The cutting member 170 is arranged at the output portion 145 of the feeding device 140 of the band-like reinforcement element 50 and comprises a disc blade 172 of the conventional type.

Upstream of the output portion 145 of the feeding device 140, apparatus 100 of the present invention comprises a member 190 for depositing an element of an elastomeric material 60 on an outer surface (with respect to the upward direction of axis Z-Z, that is in the direction away from the support plane of the feeding device 140) of the band-like reinforcement element 50. As illustrated in FIG. 1, member 190 is arranged between the diverter rollers 52 and 53 of the feeding device 140.

The element of elastomeric material 60, which is also associated with a service fabric, is collected in a reel 61 housed in the support frame 20. Thanks to the interaction provided by a second contrast roller 64, the service fabric leaves the element of elastomeric material 60 and is collected on a second winding roller 65. After that, the element of elastomeric material 60 unwound from the above reel 61 is deviated by the diverter roller 52 and, by means of the member 190, it is suitably positioned on the outer side surface of the band-like reinforcement element 50 (FIG. 1).

Figure 4A:
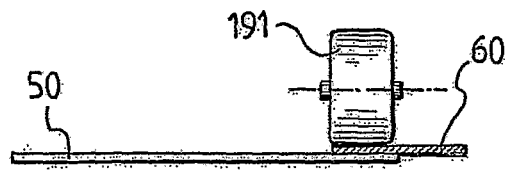
FIGS. 4a-4e schematically show in a simplified manner the detail of FIG. 4 in five subsequent operative steps.
Figure 4B:
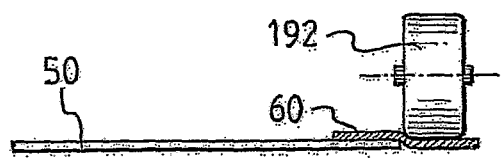
Figure 4C:
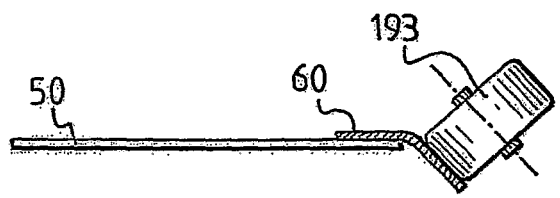
Figure 4D:
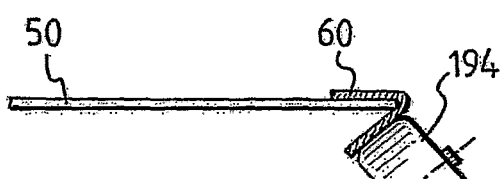
Figure 4E:
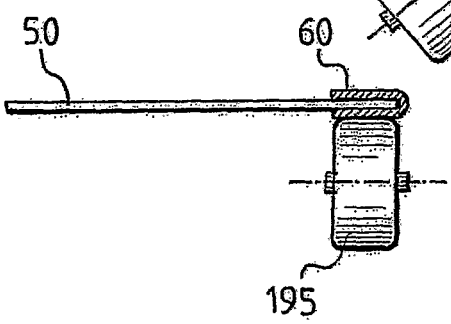

In the preferred embodiment of apparatus 100, the element of elastomeric material 60 is arranged astride the outer side surface of the band-like reinforcement element 50, so as to take the configuration shown in FIG. 4e (before cutting the reinforcement element 50 for obtaining the loop 5) and in FIG. 8 (after turning the loop 5 up about the annular anchoring structure 10). As an alternative, the element of elastomeric material 60 may be arranged cantilevered on the outer side surface of the band-like reinforcement element 50.

In any case, the element of elastomeric material 60 is coupled to the end edge 5b of loop 5 which is intended, when loop 5 is turned up about the annular anchoring structure 10, to be in a radially outer position with respect to the other end edge 5a.

With reference to FIG. 4, member 190 comprises a plurality of rollers (five in the embodiment shown, indicated with reference numerals 191-195) arranged in one after the other along the movement direction M of the band-like reinforcement element 50; at least some of such rollers have a rotation axis which is skewed with respect to the rotation axis of at least some of the other rollers.

In particular, as also illustrated in FIGS. 4a-4e, the rotation axis of the second roller 192 is parallel to that of the first roller 191, but it is arranged at a lower height with respect to the axis of roller 191 with reference to the movement plane of the band-like reinforcement element 50. The rotation axis of the third roller 193 is skewed with respect to that of rollers 191 and 192. The rotation axis of the fourth roller 194 is skewed with respect to that of rollers 191-193; in particular, it is inclined opposite to the axis of roller 192 with respect to the movement plane of the band-like reinforcement element 50. The rotation axis of the fifth roller 195 is parallel to that of rollers 191 and 192, but it is arranged opposite to the roller 191 with respect to the movement plane of the band-like reinforcement element 50.

The particular arrangement of rollers 191-195 allows depositing the element of elastomeric material 60 astride the outer side surface of the band-like reinforcement element 50 while the latter is fed towards the service drum 107a.

According to the present invention, each of the service drums 107a, 107b is radially expandable/contractable so as to be set to a plurality of predetermined radial dimensions selected according to the tyre to be manufactured.

For simplicity of description, only the service drum 107a shall be described hereinafter, it being understood that what said also applies to the service drum 107b.

With reference to FIG. 2, drum 107a comprises a plurality of support bodies 110 arranged adjacent each other along a circumferential direction and coaxial to the axis X-X. As described below, said support bodies 110 are radially movable in a synchronous manner with respect to axis X-X in the two opposite ways of the direction indicated in FIG. 2 by arrow R, between a maximum contraction position and a maximum expansion position.

Preferably, the support bodies 110 are at least eight. More preferably, such bodies are in a number comprised between twelve and twenty-four.

Each support body 110 comprises a central support body 111 and two opposite side support bodies 112 arranged at opposite sides with respect to the central body 111 along the circumferential direction. Such bodies define the annular outer surface 108 of the service drum 107a.

The central support body 111 comprises a fork-like radially inner portion 111a and a radially outer portion 111b which supports the loop 5 (FIG. 2 also shows the annular anchoring structure 10 in a radially outer position with respect to the loop 5; such configuration occurs when drum 107a moves to the position occupied in FIG. 1 by drum 107b).

The two side support bodies 112 are slidingly mounted on a guide 113 which extends parallel to axis X-X and which is integral to the radially outer portion 111b of the central support body 111. The side support bodies 112 can therefore be moved parallel to the rotation axis X-X of the service drum 107a towards one other and away from one another with respect to the central support body 111.

Figure 6:
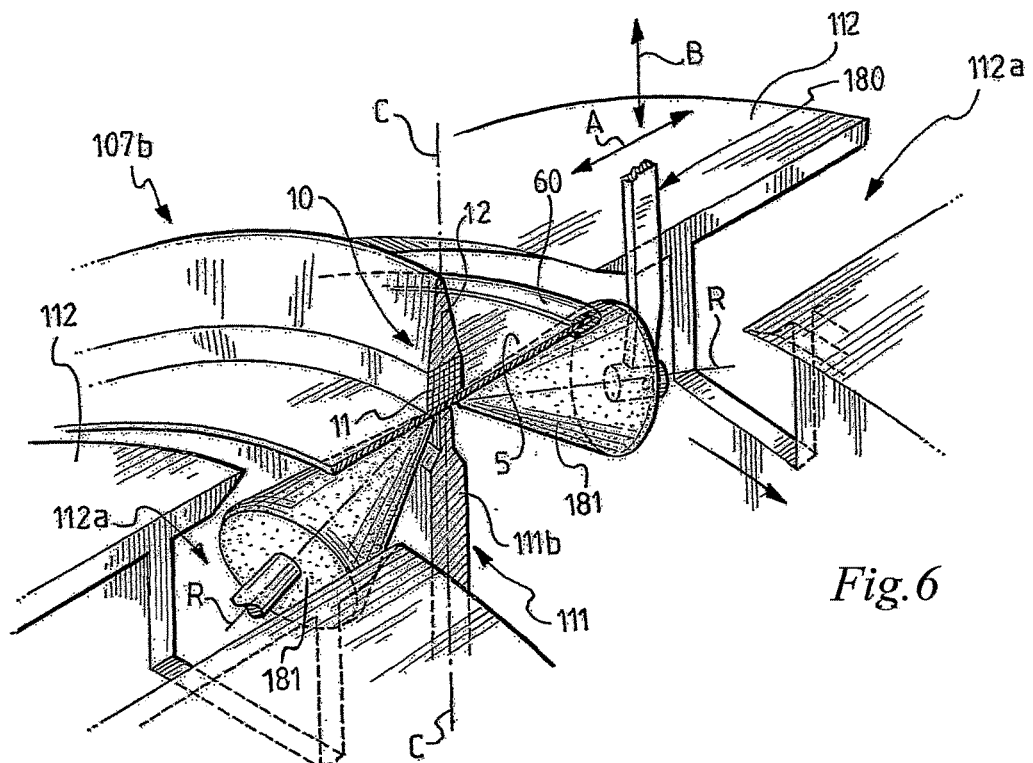
FIG. 6 is a perspective schematic view of the detail of FIG. 5 in a different operative position.
Figure 7:
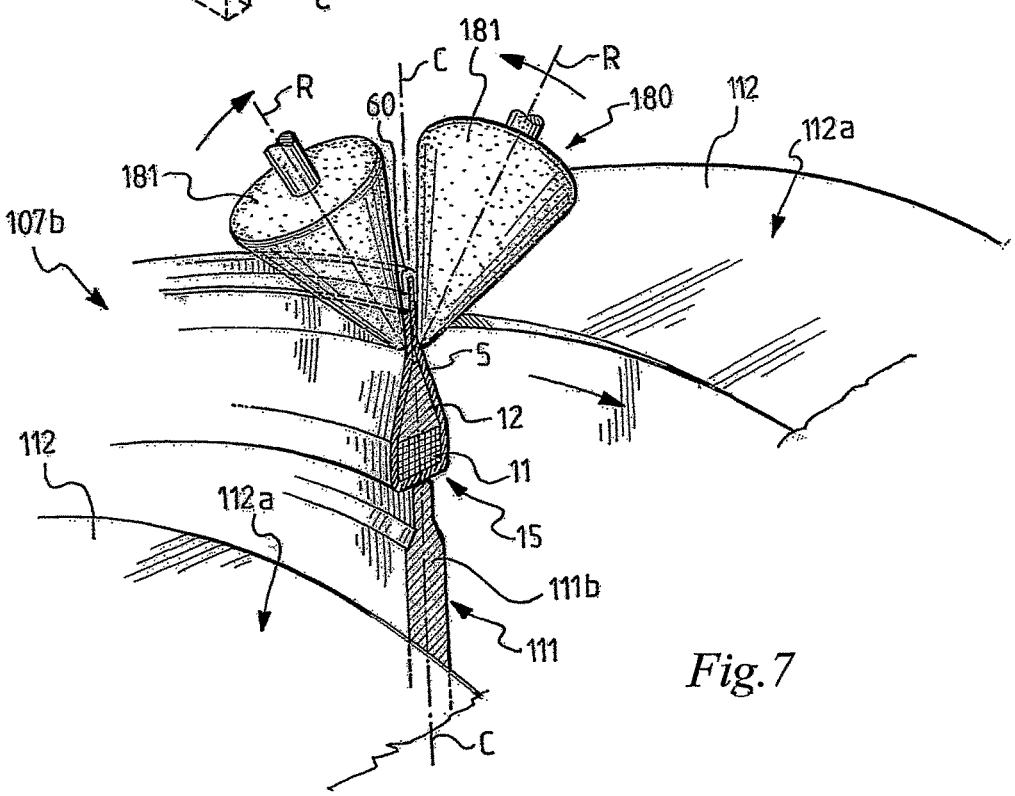
FIG. 7 is a perspective schematic view of the detail of FIG. 6 in a different operative position.

As shown in FIGS. 6 and 7, each of the side support bodies 112 comprises a radial opening 112a extended axially up to a free end facing the central support body 111. The function of such opening will appear clearly in the following part of the present description.

The radial movement of the support bodies 110 is achieved by means of a specifically provided adjustment device 114 described hereinafter.

Such adjustment device 114 comprises an annular flange 115 fitted on the shaft 106a. Such flange 115 is integral in rotation with the shaft 106a. Respective helically-shaped sliding guides 116 are formed on the opposite side faces of flange 115. In particular, such guides 116 are shaped according to an Archimedes spiral.

The central support body 111, at each arm of the fork portion 111a, carries a pin 117 housed in a respective sliding guide 116. The fork portion 111a, moreover, is integrally associated with a pair of sliding blocks 118 (only one of which is shown in FIG. 2) extended in the radial direction; each of said sliding blocks is slidingly mounted on a respective radially extended sliding guide 119 (only one of which is shown in FIG. 2).

One of the sliding guides 119 may be selectively made integral in rotation with shaft 106a; in such configuration, a predetermined angular movement of shaft 106a causes a predetermined radial movement of each support member 111.

In order to keep the support bodies 110 in the desired radial position, apparatus 100 of the present invention comprises a locking device 120 active on one of the support bodies 110, as shown always in FIG. 2.

Figure 3A:
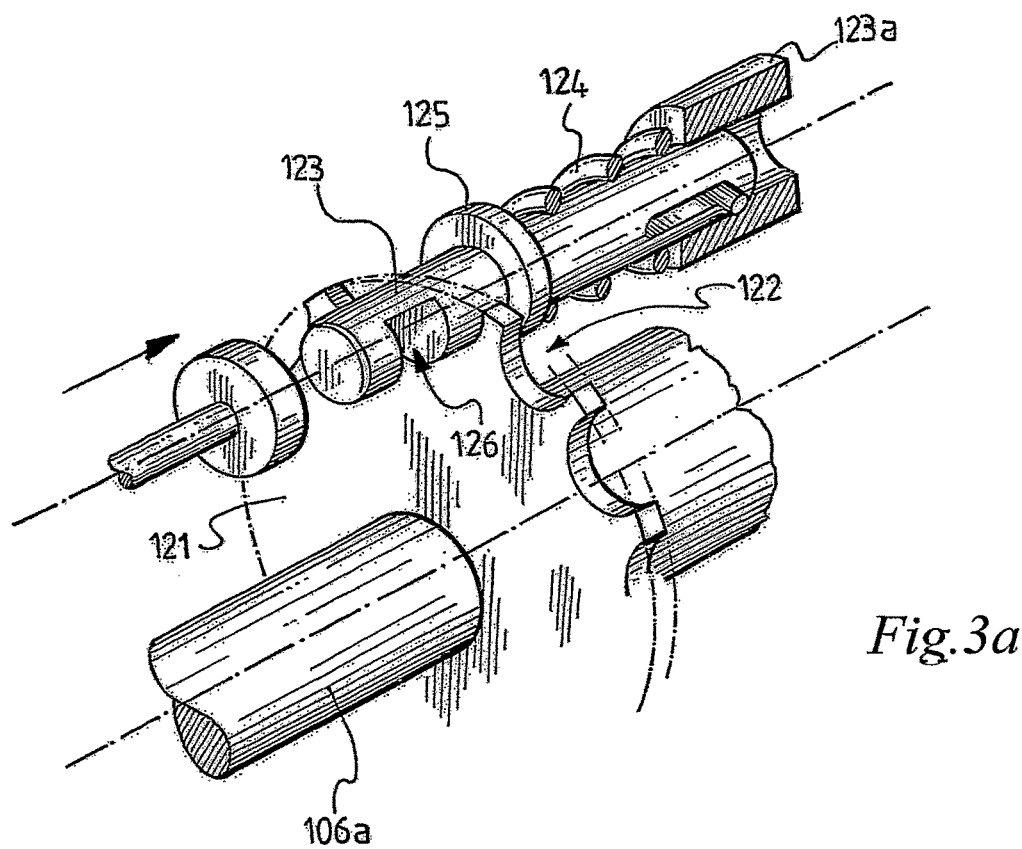
FIG. 3a is a perspective schematic view of a detail of FIG. 2, in a first operative position.
Figure 3B:
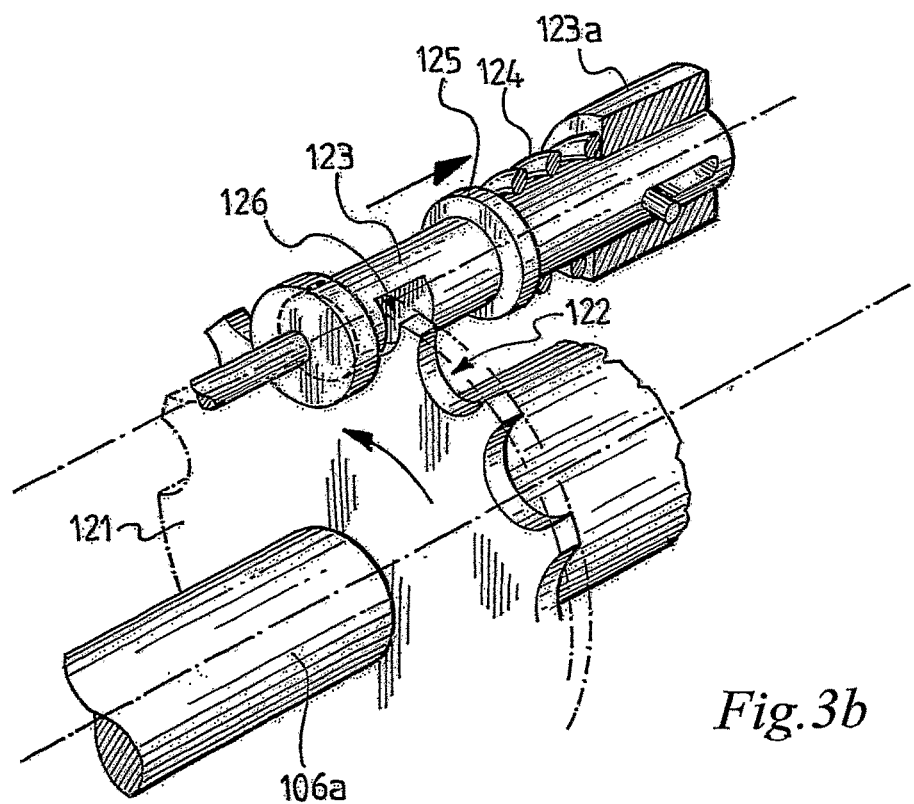
FIG. 3b is a perspective schematic view of the detail of FIG. 3a, in a second operative position.

The locking device 120 comprises a calibration flange 121 fitted on the shaft 106a so as to be integral in rotation with the latter. As shown in FIGS. 3a and 3b, flange 121 has, at the radially outer surface thereof, a plurality of slits 122 arranged along the whole circumferential extension of flange 121.

The locking device 120 further comprises a cylindrical pin 123 slidingly associated, through a spring 124, to a sleeve 123a integral to the radially extended sliding guide 119 and pivotally mounted on the shaft 106a by the interposition of a pair of rolling bearings 119a.

In particular, spring 124 is a compression spring interposed between a free end surface of sleeve 123a and an abutment flange 125 integral to pin 123.

Pin 123 is housed in one of slits 122 and comprises, opposite to the spring 124 with respect to the abutment flange 125, a slit 126 extending by only part of the circumferential extension of the pin itself.

The locking device 120 further comprises, opposite to the sleeve 123a with respect to the pin 123, a pneumatic cylinder 127 adapted to control the movement of pin 123, in opposition to the elastic action exerted by spring 124, between a first operating position, shown in FIGS. 2 and 3a, wherein pin 123 is in such an axial position that slit 126 is axially shifted with respect to slit 122 of the calibration flange 121, and a second operating position, shown in FIG. 3b, wherein pin 123 is in such an axial position that slit 126 is radially aligned with slit 122 of the calibration flange 121.

In the position of FIGS. 2 and 3a, pin 123 is coupled in rotation with the calibration flange 121, thus making the radially extended sliding guide 119 (and thus the support body 110) and shaft 106a integral in rotation. In this operating configuration, the radial position of the support bodies 110 is not altered by the rotation of shaft 106a; thus, the service drum 107a rotates without radially expanding/contracting.

On the contrary, in the position of FIG. 3b, pin 123 is disconnected in rotation from the calibration flange 121, thus making shaft 106a free to rotate with respect to the radially extended sliding guide 119 (and thus the support body 110). In this operating configuration, a rotation of shaft 106a causes a radial expansion/contraction of the support bodies 110; the service drum 107a, on the other hand, does not rotate.

Apparatus 100 further comprises, at the position occupied by the service drum 107b, a device 180 for turning loop 5 up about the annular anchoring structure 10.

Figure 5:
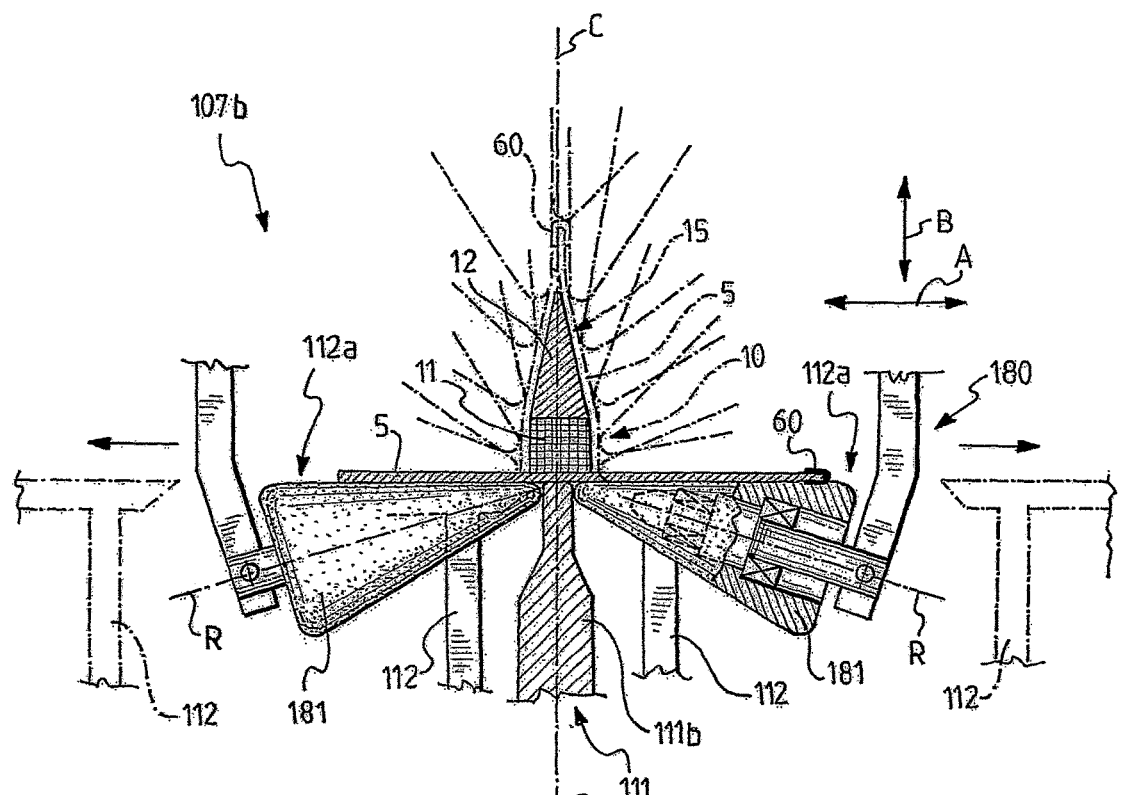
FIG. 5 is a section view of a further detail of the apparatus of FIG. 1 in an operative step of the process of the present invention.

As shown in FIGS. 5-7, the turning up device 180 comprises a pair of turning rollers 181 arranged on opposite sides with respect to a transversal middle plane C of the service drum 107b. Such rollers 181 are movable in synchrony with a combined motion along both ways of a first direction A parallel to the longitudinal axis X-X of the service drum 107b and along both ways of a second direction B perpendicular to the longitudinal axis X-X of the service drum 107b.

Rollers 181 therefore are axially and radially movable in a synchronous manner with respect to the service drum 107b along a path that reproduces the profile of the annular anchoring structure 10. The above synchronised radial movement of rollers 181 allows loop 5 to be turned up about the annular anchoring structure 10 for forming the reinforced annular anchoring structure 15.

Each roller 181 preferably has a conical shape and is idly rotatable about a rotation axis R which is tilted with respect to the longitudinal axis X-X of the drum. The rotation of rollers 181 about the respective axes R takes place by the effect of the dragging action exerted by loop 5 when the service drum 107b is made to rotate about its longitudinal axis X-X.

FIGS. 5-7 show three subsequent steps of the turning up operation.

In the step shown in FIG. 5, the side support bodies 112 are brought close to the side of the central support bodies 111 so that the loop is radially supported by both the side support bodies 112 and the central support body 111. Rollers 181 have been inserted from the top through the radial openings 112a of the side support bodies 112 to be in the position shown in FIG. 5.

FIG. 6 shows a subsequent step wherein the side support bodies 112 are moved away from the central support bodies 111 for allowing rotation of the service drum 107b (and thus of the side support bodies 112) about the longitudinal axis X-X and, concurrently with such rotation, movement of rollers 181 along directions A and B (as shown by a dashed line in FIG. 5), so as to carry out the turning up of loop 5 about the annular anchoring structure 10.

FIG. 7 shows an even subsequent step, wherein the service drum 107b has been made to rotate about the longitudinal axis X-X and rollers 181 have completed the turning up of loop 5, thus obtaining the reinforced annular anchoring structure 15 (shown in a section in FIG. 8).

Figure 9:
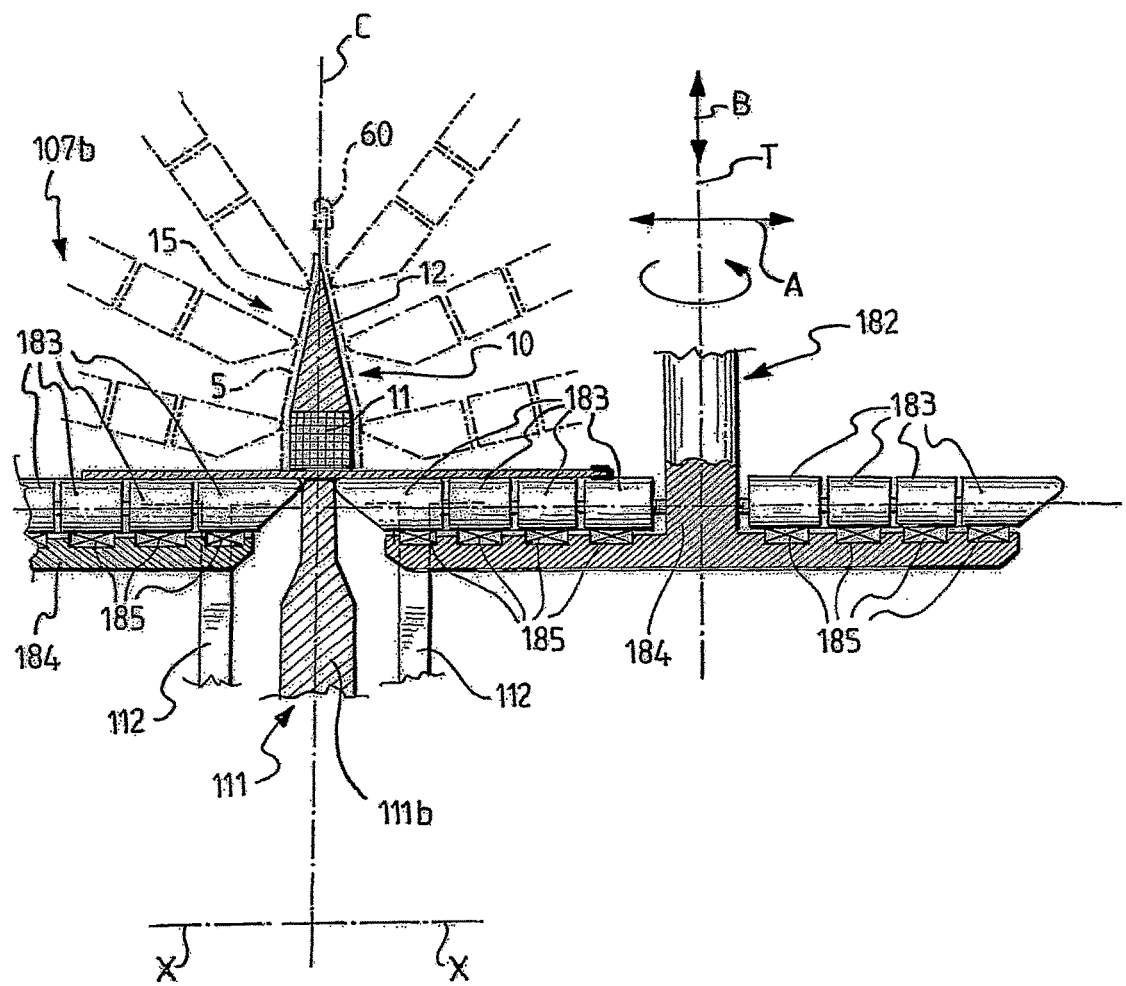
FIG. 9 is a section view of an alternative embodiment of the detail shown in FIG. 5.

FIG. 9 shows an alternative embodiment of the turning rollers, now indicated with reference numeral 182.

Rollers 182 are each defined by a plurality of small rollers (all indicated with reference numeral 183) arranged circumferentially one next to the other at a plurality of circumferences with respect to an axis T perpendicular to the longitudinal axis X-X of the service drum 107b. Rollers 183 are therefore arranged on a base element 184 along a plurality of rays around axis T. They are mounted on the base element 184 through the interposition of respective bearings 185.

The movement of rollers 182 for carrying out the turning up of loop 5 about the annular anchoring structure 10 is identical to that described above with reference to rollers 181. They are therefore moved in a synchronous manner with combined motion along directions A and B following the profile of the annular anchoring structure 10. The rotation of rollers 183 takes place by the effect of the dragging action exerted by loop 5 when the service drum 107b is made to rotate about its longitudinal axis X-X.

With reference first to FIG. 1, a preferred embodiment of the process for depositing the loop 5 on the annular anchoring structure 10 in order to form a reinforced annular anchoring structure 15 shall now be described.

In a first process step, the support bodies 110 of the service drum 107a are radially moved for setting the service drum 107a to a radial position selected on the basis of the fitting diameter of the tyre to be manufactured.

During the execution of this setting step, pin 123 of the locking device 120 is in the position shown in FIG. 3b. Being pin 123 in this position, the rotation of shaft 106a of the service drum 107a about axis X-X causes the radial movement of the support bodies 110. Such support bodies 110, however, are disconnected from shaft 106a. Therefore, rotation of shaft 106a does not cause rotation of the service drum 107a.

During the execution of this step, the side support bodies 112 of support bodies 110 are close to the respective central support bodies 111, so as to define a substantially continuous annular outer surface 108 of the service drum 107a in the circumferential direction.

Once the service drum 107a has been set to the desired radial dimension, the locking device 120 is actuated moving pin 123 to the position of FIGS. 2 and 3a. In such position, the support bodies 110 are coupled to shaft 106a and thus rotation of shaft 106a about axis X-X causes a corresponding rotation of the service drum 107a. No radial movement of the support members 110 takes place in this case.

Subsequent to the actuation of the locking device 120, the feeding of loop 5 on the annular outer surface 108 of the service drum 107a may begin.

In this step, a head portion of the band-like reinforcement element 50 is captured by suction cups 161 and moved onto the annular outer surface 108 of the service drum 107a.

The unwinding of the band-like reinforcement element 50 from reel 51 is caused by the movement of the band-like reinforcement element 50 towards the service drum 107a.

The service drum 107a is now moved in rotation about axis X-X. Because of the sticking of the head portion of the band-like reinforcement element 50 with the annular outer surface 108 of the service drum 107a, the band-like reinforcement element 50 is forced to follow the rotation of the service drum 107a; subsequent portions of band-like reinforcement element 50 are thus deposited on the annular outer surface 108 of the service drum 107a.

The service drum 107a is made to rotate by a predetermined angle α which is preferably comprised between 270° and 360°. Upon reaching such angle, the rotation of the service drum 107a is stopped and the band-like reinforcement element 50 is cut, thus obtaining a piece of band-like reinforcement element 50 which, by most of its longitudinal extension is associated with the annular outer surface 108 of the service drum 107a and which comprises a tail portion not yet deposited on the above annular outer surface 108.

At the end of the cut, the service drum 107a is set in rotation again at least up to completing one full revolution. During such rotation, the tail portion of the band-like reinforcement element 50 is deposited onto the annular outer surface 108 of the service drum 107a.

As an alternative to the process described above which provides for the cutting of the reinforcement element after most of the band-like reinforcement element 50 has been deposited on the annular outer surface 108 of the service drum 107a, a process can be provided wherein the band-like reinforcement element 50 is cut to size before being fed towards the service drum 107*a*. In this case, deposition of the band-like reinforcement element 50 onto the annular outer surface 108 of the service drum occurs in a continuous manner while the service drum 107*a* rotates by an angle at least equal to 360°.

During all the step of feeding the band-like reinforcement element 50 on the service drum 107*a*, member 190 applies the element made from elastomeric material 60 astride of the outer side surface of the band-like reinforcement element 50, as shown in FIG. 4 and in FIGS. 4*a*-4*e*. In practice, rollers 191-195, acting one after the other on the element of elastomeric material 60 during the movement of band-like reinforcement element 50, bend the element of elastomeric material 60 on the outer side surface of the band-like reinforcement element 50.

The unwinding of the element of elastomeric material 60 from reel 61 is preferably caused by the above movement of the band-like reinforcement element 50 towards the service drum 107*a*.

Preferably, the loop 5 is deposited on an annular portion of the annular outer surface 108 of the service drum 107*a* which is not centred with respect to a transversal middle plane C of the service drum 107*a*.

Once loop 5 has been deposited on the service drum 107*a*, the service member 105 is made to rotate about the pivoting axis Z-Z up to exchange the position of service drum 107*a* with service drum 107*b*.

After that, an annular anchoring structure 10 is loaded on the service drum 107*a* in a centred position with respect to the transversal middle plane C of the service drum 107*a*. The annular anchoring structure 10 is taken from the storage member 101 by the gripping member 132.

In particular, during the execution of such step, the motorised arm 131 of the gripping member 132 is brought to a front position with respect to the storage member 101 and is moved along direction P to insert arms 133 into grooves 104. The grip of the annular anchoring structure 10 takes place at the radially innermost surface thereof by the radial expansion of arms 133.

The motorised arm 131 is then brought to the service drum 107*a*. During such movement, the annular anchoring structure 10 is centred on the gripping member 132; such centring is obtained by radially moving in a synchronous manner the centring arms 133.

When the gripping member 132 is at the service drum 107*a*, it fits the annular anchoring structure 10 on the service drum 107*a*. The unloading of the annular anchoring structure 10 is obtained by retracting in a synchronous manner arms 133 of the gripping member 132.

The motorised arm 131, once the annular anchoring structure 10 has been unloaded on the service drum 107*a*, is moved towards the storage member 101, so as to be ready to take a new annular anchoring structure 10.

Following the positioning of the annular anchoring structure 10 onto the service drum 107*a*, the latter is made to radially expand to lock the annular anchoring structure into position before turning loop 5 up.

To this end, the locking device 120 is deactivated returning pin 123 in the position shown in FIG. 3*b* and shaft 106*a* of the service drum 107*a* is made to rotate about axis X-X until drum 107*a*, because of its expansion, steadily locks the annular anchoring structure 10.

At this point, the locking device 120 is actuated again moving pin 123 to the position of FIGS. 2 and 3*a*.

Loop 5 can now be turned up about the annular anchoring structure 10.

In a first step of the turning up process, rollers 181 are inserted from the top through the radial openings 112*a* of the side support bodies 112 to move to a radially inner position with respect to the side support bodies 112, as shown in FIG. 5.

In a subsequent step, shown in FIG. 6, the side support bodies 112 are moved away from the central support body 111.

In an even subsequent step, shown in FIG. 7, the service drum 107*b* is moved in rotation about the longitudinal axis X-X and at, simultaneously with such rotation, rollers 181 are moved in a synchronous manner along directions A and B following the profile of the annular anchoring structure 10 (the movement of rollers 181 is shown with a dashed line in FIG. 5).

At the end of this last step, rollers 181 have completed the turning up of loop 5, thus obtaining the reinforced annular anchoring structure 15.

Once the turning up of loop 5 has been completed, the reinforced annular anchoring structure 15 is taken from the service drum 107*a* and brought onto the storage member 102.

In such step, the service drum 107*a* is radially contracted to unload the reinforced annular anchoring structure 15. Such contraction occurs by moving pin 123 of the locking device 120 to the position shown in FIG. 3*b* and after that, rotating shaft 106*a* of the service drum 107*a* by a certain angle about axis X-X.

The motorised arm 135 in the meantime has been moved up to position itself close to the service drum 107*a*, wherefrom it takes the reinforced annular anchoring structure 15. Taking of the reinforced annular anchoring structure 15 occurs by synchronously expanding arms 133 of the gripping member 136. In the meantime, the side support bodies 112 of the service drum 107*a* move close to the respective central support bodies 111.

After that, the motorised arm 135 is moved up to position itself close to the storage member 102. When the gripping member 136 is placed in front of the storage member 102, it is moved along direction P so as to insert arms 133 in grooves 104. The reinforced annular anchoring structure 15 is then unloaded on the storage member 102. Such unloading is obtained by synchronously retracting arms 133.

The motorised arm 135, once the annular anchoring structure 15 has been unloaded on the storage member 102, is moved towards the service drum 107*a*, so as to be ready to take a new reinforced annular anchoring structure 15.

During the movement of the motorised arm 135 towards the storage member 102, the service member 105 is made to rotate about the pivoting axis Z-Z to exchange again the position of service drum 107*a* with service drum 107*b*. At this point, apparatus 100 is ready to repeat the process described above.

According to the present invention, while the setting of the service drum 107*a* and/or the deposition of loop 5 on service drum 107*a* are carried out, at least part of the step of positioning an annular anchoring structure 10 on a loop 5 previously deposited on the service drum 107*b* and/or of the step of turning loop 5 up about the annular anchoring structure 10 for forming a reinforced annular anchoring structure 15 are carried out on service drum 107*b*. When position of the service drums 107*a*, 107*b* is exchanged, positioning of a new annular anchoring structure 10 and turning up of loop 5 about such annular anchoring structure 10 for forming a new reinforced annular anchoring structure 15 are carried out on the service drum 107*a* (that at this point is in the position occupied by service drum 107*b* in FIG. 1)

there is carried out the, while deposition of a new loop 5 on the service drum 107b is carried out, the reinforced annular anchoring structure 15 previously having been removed from the service drum 107b (that at this point is in the position occupied by service drum 107a in FIG. 1).

Moreover, while the turning up of loop 5 is carried out, the loading/unloading device 130 deposits the reinforced annular anchoring structure 15 on the storage member 102 and takes a new annular anchoring structure 10 from the storage member 101.

The process described above may be repeated a predetermined number of times for forming, starting from a plurality of annular anchoring structures 10, a corresponding plurality of reinforced annular anchoring structures 15 to be used in subsequent process for building carcass structures for tyres for vehicle wheels.

From the above description it is clear that the process of the present invention allows carrying out the looping of annular anchoring structures having different radial dimensions with a single apparatus as described above.

It is clear that a man skilled in the art may make further changes and variants to the invention described hereinbefore in order to meet specific and incidental application requirements, changes and variants in any case falling within the scope of protection defined in the following claims.

The invention claimed is:

1. A process for manufacturing a tyre for a vehicle wheel, comprising the step of building a carcass structure comprising at least one carcass ply associated, at axially opposite end edges thereof, with respective annular anchoring structures, wherein the step of building the carcass structure comprises the step of reinforcing at least one annular anchoring structure with a loop, said reinforcement step being carried out on at least one radially expandable/contractable service drum having a longitudinal axis and comprising the steps of:
   a) radially moving a plurality of support members of the at least one service drum to set the at least one service drum to a predetermined operative radial dimension selected according to a fitting diameter of a tyre to be manufactured, wherein during execution of step a) a central support body and side support bodies of the at least one service drum define an annular outer surface of the at least one service drum in the circumferential direction;
   b) depositing the loop on an annular portion of the annular outer surface of the at least one service drum;
   c) loading the at least one annular anchoring structure onto the at least one service drum in a radially outer position with respect to the loop;
   d) radially expanding the at least one service drum up to a radially-expanded configuration to lock in position the at least one annular anchoring structure, thereby radially expanding the entire loop;
   e) rotating the at least one service drum about the longitudinal axis thereof while the at least one service drum is in the radially-expanded configuration;
   f) during rotation of the at least one service drum, turning the loop up about the at least one annular anchoring structure with at least one pair of turning rollers so as to form at least one reinforced annular anchoring structure; and
   g) unloading the at least one reinforced annular anchoring structure from the at least one service drum;
   the process further comprising, between steps d) and e), moving the at least one pair of turning rollers through radial openings in the side support bodies to a radially inner position with respect to the loop and subsequently moving the side support bodies away from the loop for allowing rotation of the at least one service drum.

2. The process according to claim 1, further comprising the step of positioning the at least one reinforced annular anchoring structure on an end edge of the at least one carcass ply, wherein before carrying out said positioning step, steps from a) to g) are repeated for a predetermined number of times.

3. The process according to claim 1, wherein at least one of steps a) and b) is carried out at least in part simultaneously with at least part of at least one of steps c) to g).

4. The process according to claim 1, wherein the step of turning the loop up is carried out at least in part simultaneously with at least part of at least one of step g) of unloading the at least one reinforced annular anchoring structure from the at least one service drum and step c) of loading a new annular anchoring structure onto the at least one service drum.

5. The process according to claim 1, wherein step c) of loading the at least one annular anchoring structure onto the at least one service drum comprises the steps of:
   taking the at least one annular anchoring structure from a first storage member; and
   moving the at least one annular anchoring structure from the first storage member to the at least one service drum.

6. The process according to claim 1, wherein step g) of unloading the at least one reinforced annular anchoring structure from the at least one service drum comprises the steps of:
   radially contracting the at least one service drum;
   taking the at least one reinforced annular anchoring structure from the at least one service drum; and
   moving the at least one reinforced annular anchoring structure from the at least one service drum to a second storage member.

7. The process according to claim 1, wherein step a) of setting the at least one service drum to a predetermined operative radial dimension, comprises a step of radially expanding the at least one service drum until the annular outer surface thereof reaches a predetermined diameter selected according to the fitting diameter of the tyre to be manufactured.

8. The process according to claim 1, comprising, between step b) of depositing the loop onto an annular portion of the annular outer surface of the at least one service drum and step c) of loading the at least one annular anchoring structure onto the at least one service drum in a radially outer position with respect to the loop, a step of moving the at least one service drum from a first work station defined at a feeding device of the loop to a second work station defined at a device for loading/unloading the at least one annular anchoring structure onto/from the at least one service drum.

9. The process according to claim 1, wherein the loop is obtained by cutting to size a band-like reinforcement element and step b) of depositing the loop onto an annular portion of the annular outer surface of the at least one service drum comprises the steps of:
   feeding the band-like reinforcement element toward the at least one service drum;
   depositing a head portion of the band-like reinforcement element onto the annular outer surface of the at least one service drum;
   rotating the at least one service drum by a predetermined angle about the longitudinal axis thereof; and during said rotation, depositing new portions of the band-like reinforcement element onto the annular outer surface of the at least one service drum until a tail portion of the band-like reinforcement element is deposited.

10. The process according to claim 9, wherein said predetermined angle is equal to at least 360°, and wherein the band-like reinforcement element is cut to size before being fed toward the at least one service drum.

11. The process according to claim 9, comprising, during the step of feeding the band-like reinforcement element toward the at least one service drum, associating an element made from elastomeric material on an outer side surface of the band-like reinforcement element.

12. The process according to claim 11, wherein said element made from elastomeric material is arranged astride the outer side surface of the band-like reinforcement element.

13. The process according to claim 11, wherein said element made from elastomeric material is associated cantilevered with the outer side surface of the band-like reinforcement element.

14. The process according to claim 1, wherein said annular portion of the annular outer surface of the at least one service drum is in an offset axial position with respect to the transversal middle plane of the at least one service drum.

15. The process according to claim 1, wherein step c) of loading the at least one annular anchoring structure onto the at least one service drum comprises the step of positioning the at least one annular anchoring structure in a centered position with respect to the transversal middle plane of the at least one service drum.

16. The process according to claim 1, wherein said turning rollers are arranged on opposite sides with respect to a transversal middle plane of the at least one service drum.

17. The process according to claim 1, wherein the step of turning the loop up further comprises using each turning roller in said pair of turning rollers to turn up an end edge of the loop about the same reinforced annular anchoring structure of the at least one reinforced annular anchoring structure.

18. The process according to claim 1, wherein the step of turning the loop up further includes moving in synchrony the at least one pair of turning rollers about a single annular anchoring structure of the at least one annular anchoring structure along a first direction parallel to the longitudinal axis of the at least one service drum and along a second direction perpendicular to the longitudinal axis of the at least one service drum.

19. A process for reinforcing with a loop an annular anchoring structure of a tyre for a vehicle wheel, comprising the steps of:
   a) radially moving a plurality of support members of a radially expandable/contractable service drum to set the service drum to a predetermined operative radial dimension selected according to a fitting diameter of a tyre to be manufactured, wherein during execution of step a) a central support body and side support bodies of the service drum define an annular outer surface of the service drum in the circumferential direction;
   b) depositing the loop on an annular portion of the annular outer surface of the service drum;
   c) loading the annular anchoring structure onto the service drum in a radially outer position with respect to the loop;
   d) radially expanding the service drum up to a radially-expanded configuration to lock in position the annular anchoring structure, thereby radially expanding the entire loop;
   e) rotating the service drum, about a longitudinal axis thereof while the service drum is in the radially-expanded configuration;
   f) during rotation of the service drum, turning the loop up about the annular anchoring structure with at least one pair of turning rollers so as to form a reinforced annular anchoring structure; and
   g) unloading the reinforced annular anchoring structure from the service drum;
   the process further comprising, between steps d) and e), moving the at least one pair of turning rollers through radial openings in the side support bodies to a radially inner position with respect to the loop and subsequently moving the side support bodies away from the loop for allowing rotation of the service drum;
   wherein the step of turning the loop up is carried out by moving in synchrony the at least one pair of turning rollers along a first direction parallel to the longitudinal axis of the service drum and along a second direction perpendicular to the longitudinal axis of the service drum, said at least one pair of turning rollers being arranged on opposite sides with respect to a transversal middle plane of the service drum.

20. A process for manufacturing a tyre for a vehicle wheel, comprising the step of building a carcass structure comprising at least one carcass ply associated, at axially opposite end edges thereof, with respective annular anchoring structures, wherein the step of building the carcass structure comprises the step of reinforcing at least one annular anchoring structure with a loop, said reinforcement step being carried out on at least one radially expandable/contractable service drum mounted on a respective service shaft and comprising the steps of:
   a) radially moving a plurality of support members of the at least one service drum to set the at least one service drum to a predetermined operative radial dimension selected according to a fitting diameter of a tyre to be manufactured, wherein during execution of step a) a central support body and side support bodies of the at least one service drum define an annular outer surface of the at least one service drum in the circumferential direction;
   b) depositing the loop on an annular portion of the annular outer surface of the at least one service drum;
   c) loading the at least one annular anchoring structure onto the at least one service drum in a radially outer position with respect to the loop;
   d) disengaging the at least one service drum from the respective service shaft and rotating the respective service shaft to cause radial expansion of the at least one service drum up to a radially-expanded configuration to lock in position the at least one annular anchoring structure;
   e) engaging the at least one service drum to the respective service shaft and rotating the respective service shaft to cause rotation of the at least one service drum about a longitudinal axis thereof while the at least one service drum is in the radially-expanded configuration;
   f) during rotation of the at least one service drum, turning the loop up about the at least one annular anchoring structure with at least one pair of turning rollers so as to form at least one reinforced annular anchoring structure; and g) unloading the at least one reinforced annular anchoring structure from the at least one service drum;

the process further comprising, between steps d) and e), moving the at least one pair of turning rollers through radial openings in the side support bodies to a radially inner position with respect to the loop and subsequently moving the side support bodies away from the loop for allowing rotation of the service drum.

21. A process for manufacturing a tyre for a vehicle wheel, comprising the step of building a carcass structure comprising at least one carcass ply associated, at axially opposite end edges thereof, with respective annular anchoring structures, wherein the step of building the carcass structure comprises the step of reinforcing at least one annular anchoring structure with a loop, said reinforcement step being carried out on at least one radially expandable/contractable service drum and comprising the steps of:

a) radially moving a plurality of support members of the at least one service drum to set the at least one service drum to a predetermined operative radial dimension selected according to a fitting diameter of a tyre to be manufactured, wherein during execution of step a) side support bodies of the at least one service drum partially define an annular outer surface of the at least one service drum in the circumferential direction;

b) depositing the loop on an annular portion of the annular outer surface of the at least one service drum;

c) loading the at least one annular anchoring structure onto the at least one service drum in a radially outer position with respect to the loop;

d) radially expanding the at least one service drum up to a radially-expanded configuration to lock in position the annular anchoring structure, thereby radially expanding the entire loop;

e) rotating the at least one service drum, about a longitudinal axis thereof while the at least one service drum is in the radially-expanded configuration;

f) during rotation of the at least one service drum, turning the loop up about the at least one annular anchoring structure with at least one pair of turning rollers so as to form at least one reinforced annular anchoring structure; and g) unloading the at least one reinforced annular anchoring structure from the at least one service drum;

the process further comprising, between step b) of depositing the loop onto an annular portion of the annular outer surface of the at least one service drum and step c) of loading the at least one annular anchoring structure onto the at least one service drum in a radially outer position with respect to the loop, a step of moving the at least one service drum from a first work station defined at a feeding device of the loop to a second work station defined at a device for loading/unloading the at least one annular anchoring structure onto/from the at least one service drum; and the process further comprising, between steps d) and e), moving the at least one pair of turning rollers through radial openings in the side support bodies to a radially inner position with respect to the loop and subsequently moving the side support bodies away from the loop for allowing rotation of the service drum.

* * * * *